(12) United States Patent
Brabenac

(10) Patent No.: US 10,506,138 B2
(45) Date of Patent: Dec. 10, 2019

(54) DRIVING DISPLAYS AT CINEMATIC FRAME RATES

(71) Applicant: Intel Corporation, Santa Clara, CA (US)

(72) Inventor: Charles L. Brabenac, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/056,967

(22) Filed: Feb. 29, 2016

(65) Prior Publication Data

US 2016/0352978 A1 Dec. 1, 2016

Related U.S. Application Data

(63) Continuation of application No. 13/453,680, filed on Apr. 23, 2012, now Pat. No. 9,275,603.

(51) Int. Cl.
*H04N 5/04* (2006.01)
*G09G 5/00* (2006.01)
*G06F 3/14* (2006.01)

(52) U.S. Cl.
CPC .............. *H04N 5/04* (2013.01); *G09G 5/005* (2013.01); *G06F 3/14* (2013.01); *G09G 2320/103* (2013.01); *G09G 2340/0435* (2013.01); *G09G 2370/16* (2013.01)

(58) Field of Classification Search
CPC ..................................................... G09G 5/003
See application file for complete search history.

(56) References Cited

U.S. PATENT DOCUMENTS

| | | | | |
|---|---|---|---|---|
| 5,729,243 A * | 3/1998 | Cavallerano | ........... | G09G 3/346 345/59 |
| 6,019,473 A * | 2/2000 | Goodhill | .................. | G03B 1/24 352/180 |
| 6,157,395 A * | 12/2000 | Alcorn | ....................... | G06F 3/14 345/504 |
| 6,549,240 B1 * | 4/2003 | Reitmeier | ............ | H04N 7/0105 348/445 |
| 8,281,343 B2 * | 10/2012 | Kaplan | .................. | H04N 7/163 345/532 |
| 8,542,221 B1 * | 9/2013 | Wyatt | ..................... | G06F 15/00 345/204 |
| 8,576,336 B2 * | 11/2013 | Johnson | ................. | G09G 5/005 345/102 |
| 9,275,603 B2 | 3/2016 | Brabenac | | |
| 2002/0190979 A1 * | 12/2002 | Stoll | ......................... | G06T 1/60 345/418 |
| 2003/0234790 A1 * | 12/2003 | Hochmuth | ................ | G06F 3/14 345/545 |
| 2004/0085304 A1 * | 5/2004 | Hsieh | ....................... | H04N 7/01 345/204 |

(Continued)

*Primary Examiner* — Patrick N Edouard
*Assistant Examiner* — Peijie Shen
(74) *Attorney, Agent, or Firm* — Schiff Hardin LLP

(57) ABSTRACT

Described herein are technologies related to playing moving-images content and more particularly to playing such content on a display possessing a display refresh rate which is typically greater than the inherent frame rate (e.g., a cinematic frame rate) of the content. This Abstract is submitted with the understanding that it will not be used to interpret or limit the scope or meaning of the claims.

21 Claims, 5 Drawing Sheets

(56) References Cited

U.S. PATENT DOCUMENTS

| | | | |
|---|---|---|---|
| 2004/0239803 A1* | 12/2004 | Selby | G09G 5/005 348/459 |
| 2006/0146040 A1* | 7/2006 | Shen | G09G 5/12 345/204 |
| 2006/0161964 A1* | 7/2006 | Chung | H04N 5/775 725/141 |
| 2008/0055318 A1* | 3/2008 | Glen | G09G 3/20 345/501 |
| 2008/0303833 A1* | 12/2008 | Swift | G06T 15/005 345/505 |
| 2008/0303846 A1* | 12/2008 | Brichter | G06F 3/14 345/661 |
| 2009/0185795 A1* | 7/2009 | Itani | H04N 5/775 386/232 |
| 2009/0284442 A1* | 11/2009 | Pagan | G06F 3/1454 345/2.1 |
| 2009/0300499 A1* | 12/2009 | Fukui | G06F 3/1454 715/722 |
| 2010/0013995 A1* | 1/2010 | Um | G06F 1/3203 348/500 |
| 2011/0072473 A1* | 3/2011 | Funabiki | H04N 21/43637 725/81 |
| 2011/0103472 A1* | 5/2011 | Lefebvre | H04N 21/4122 375/240.12 |
| 2011/0163939 A1* | 7/2011 | Tam | G06F 3/1454 345/2.3 |
| 2012/0032935 A1* | 2/2012 | Yen | G09G 3/20 345/211 |
| 2012/0169954 A1* | 7/2012 | Liu | G09G 3/3611 349/38 |
| 2012/0293679 A1* | 11/2012 | Aiba | H04N 9/8205 348/222.1 |
| 2013/0106810 A1* | 5/2013 | Kim | G06F 1/3265 345/204 |
| 2013/0141642 A1* | 6/2013 | Wu | G06F 3/1407 348/441 |
| 2013/0257752 A1* | 10/2013 | Tripathi | G09G 3/20 345/173 |

* cited by examiner

DRIVING DISPLAYS AT CINEMATIC FRAME RATES

BACKGROUND

Content providers often capture moving-images content (e.g., video or digital film) at a defined frame rate and store the resulting frames on media for subsequent playback. They also frequently capture such content in frames for real-time streaming, broadcast, etc. It has been found that such content, if captured and processed at certain "cinematic" frame rates, usually produces satisfactory moving images (hereinafter simply "images") when displayed at those cinematic frame rates and when no disturbances interfere with the distribution or display of that content.

Indeed, with the advent of high quality, high fidelity, high definition (HD), and/or premium quality content, many providers capture such content at cinematic frame rates of 23.976/24.000 fps and 25.000 fps (hereinafter 24 fps and 25 fps respectively) among others. For instance, some HD systems capture content at 24 fps using a "1080p" (1080 lines of resolution per frame in progressive "p") format. A non-limiting but common example of such content is a Blu-Ray Disc® movie.

Unfortunately, many conventional display systems and their pipeline components process and present moving-images content at a different rate than the cinematic frame rate. Indeed, many displays operate on or about a default screen refresh rate of 60 Hz, rather than one of the many available cinematic frame rates. This is particularly true of conventional displays often used in conjunction with personal computers (PCs) that can at times simultaneously support a variety of content types and rates, in addition to cinematic content. As a result, the transmitters (and/or wired connectors) in many PCs and other devices often transmit at a default rate of 60 Hz, even in cases where the display can more optimally support 24 Hz. This is due to the lack of a mechanisms to automatically identify and adapt to cinematic content when it is being presented.

To account for such rate mis-matches and the lack of ability to identify when cinematic content is being presented, digital display system components (e.g., PCs, displays, etc.) up-convert to operate at the display's default refresh rate (e.g., 60 Hz) by inserting duplicates of the individual frames of cinematic frame-rate content into the to-be-displayed content using a patterned sequence. However, a pipeline of content-processing components often lies between the media containing the content (or a source generating the content) and the display. Many of these components possess limitations and/or preferred frame rates, protocols, buffering schemes, etc. that might not be entirely compatible with, knowledgeable of, or adjustable to the content's cinematic frame rate, and they might not even be compatible with the refresh rate of the display itself and/or the native frame rate of other pipeline components.

Thus, frame rate mis-matches and de-synchronizations can occur in the pipeline that cause undesired duplicate frames, dropped frames, torn frames, judder-related effects, etc. in the resulting moving images presented to the viewer by the display. Instead of a smoothly flowing image, therefore, many conventional displays sometimes present "jerky" images (images which exhibit effects of phenomenon commonly and collectively referred to as "judder").

Moreover, some conventional systems attempt to overcome the foregoing effects by driving their displays at the higher rates native to the displays (or at even higher frame rates). This approach assumes that if the display is driven at a sufficiently high rate, some of the problems associated with the jerky images decrease. However, some duplicate, dropped, and/or possibly torn images will still occur because of the lack of synchronization between the various pipeline components between (and including) the media players and the displays. Moreover, some pipeline components might have difficulty keeping pace with the higher display refresh rate. For example, one of the pipeline content-processing components upstream of the display could be limited to 30 Hz operation, thereby preventing or severely limiting the ability of the pipeline to account for rate mis-matches, regardless of the downstream display's higher rate capabilities.

When lower frame rate content is being presented, driving the display and pipeline components at such high frame rates consumes more electrical power, computing power (i.e., processing, memory, etc.), and communications link bandwidth throughout the pipeline as compared with operating at lower rates. The presence of battery powered and/or wireless devices (for instance, laptop personal computers or PCs and wireless displays) aggravate the foregoing effects. Video encoding, decoding and encryption and other schemes used to secure the digital rights of the content providers further aggravate the situation since these techniques require comparatively intense processing. Furthermore, because of those processing demands in part, these operations increase the likelihood of upsets throughout the pipeline.

BRIEF DESCRIPTION OF THE DRAWINGS

The Detailed Description references the accompanying figures. In the figures, the left-most digit(s) of a reference number identifies the figure in which the reference number first appears. The same numbers are used throughout the drawings to reference like features and components.

DETAILED DESCRIPTION

Disclosed herein are technologies for distributing content that relate to the smoothness of moving images presented on various displays. More specifically, disclosed technologies detect the playing or generation of a particular piece of content (e.g., video) and, responsive thereto, perform actions to facilitate the smooth presentation of such content on a display. For instance, the technology of some embodiments can detect the inherent frame rate of the content and whether that frame rate is a cinematic frame rate. If the frame rate is a cinematic frame rate, then the technology switches to driving some or all display and/or pipeline components at the cinematic rate rather than at the refresh rate associated with the display.

Exemplary Embodiments

Figure 1:
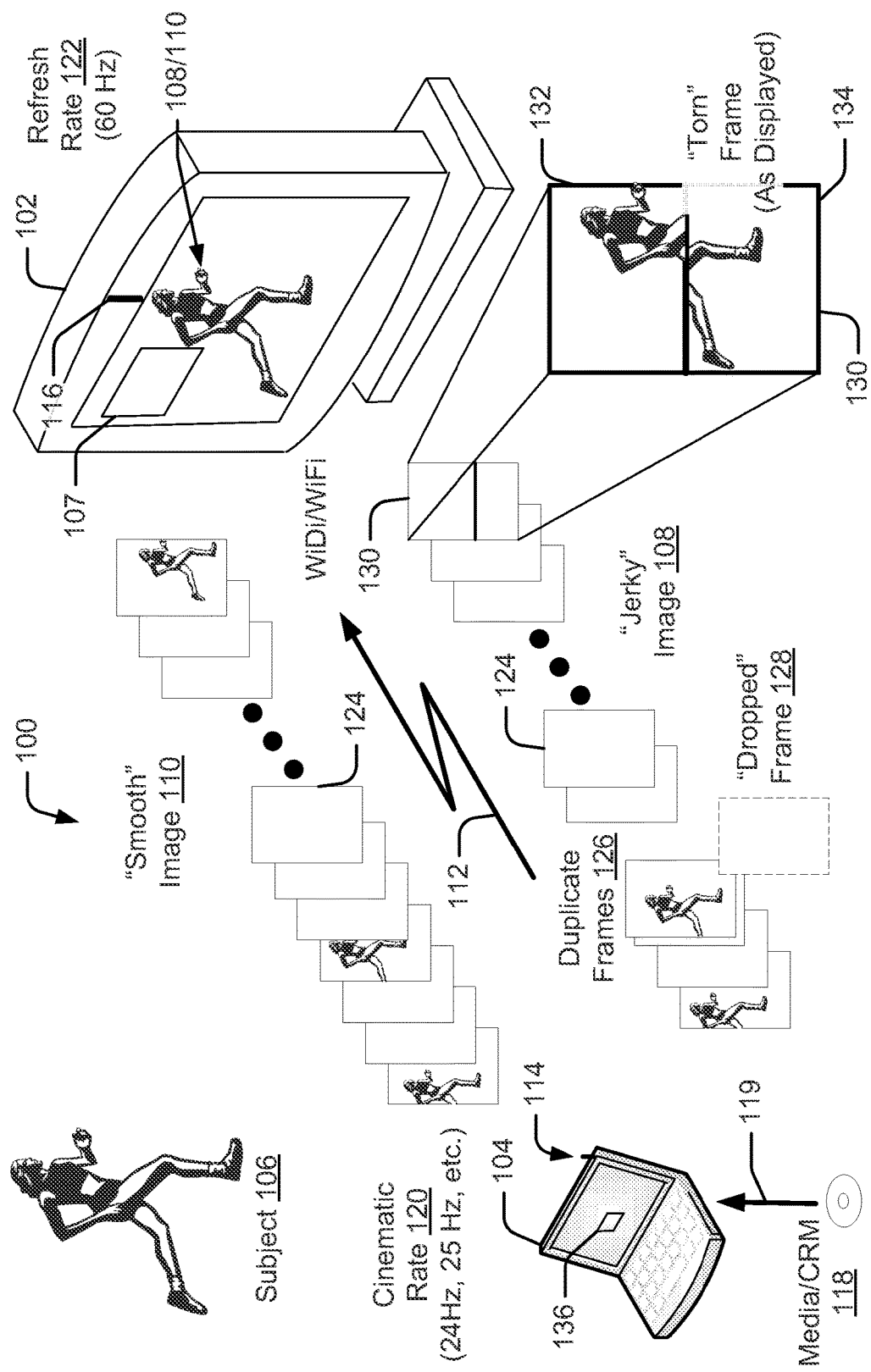
FIG. 1 schematically illustrates a content distribution system.

FIG. 1 schematically illustrates a moving-images content distribution system. Such a system is an example implementation. More specifically, FIG. 1 illustrates a system 100 that includes a display 102 and a device for playing, distributing and displaying images (hereinafter a "media device" 104) of a subject 106. Often, a PC (or other computing device, such as a laptop, PC, tablet, smartphone, etc.) incorporates the media device 104 and places it in wireless communication with the display 102. Moreover, users often utilize the media device 104 to both display cinematic content (i.e., content with an associated cinematic frame rate) on the display 102 and to play games, manipulate information with productivity applications, etc. These users often perform each of these functions in separate windows (or portions 107) of the display 102 in a graphical user interface presented on the display 102. The media device 104 can be or include a DVD (digital video disk) player, a CD (compact disk) player, an MP3 (Moving Picture Experts Group-1 Audio Layer-3) player, a video recorder, a television camera, a microphone, etc. with the media 118 being a corresponding type of CRM (computer readable media). In addition, the media device 104 can include a program, application, etc. which manages the playing (or generation) of the content 119 and which is frequently referred to as a media player.

With the new moving-images content distribution systems disclosed herein, the display 102 may render or present content at differing rates. For instance, most productivity applications and some games can appear aesthetically and/or ergonomically pleasing if pipeline components are capable of operating at display-related refresh rates (typically 60 Hz) or a rate associated with some particular pipeline component. In contrast, users may enjoy cinematic content when it is presented at one of the lower cinematic frame rates (for instance, 24 Hz, 25 Hz, or other cinematic rates) in different windows or in full screen mode. Some games however, involve 3D rendering of moving-images at semi-fixed rates where smooth movement of images is sometimes considered to be critical. Many such games render these moving images at fixed rates which are often different (and less) than the display refresh rate.

Conventional systems, though, force all content (in all windows being processed by pipeline components and presented by the display 102) to be rendered at the display's refresh rate, even if one particular window 107 is being viewed in full screen mode, is relatively large compared with other windows, and/or if that refresh rate is appropriate for all such content. As a result, the content of one or more of the windows will typically suffer and will therefore appear jerky (i.e., a viewer will likely consider it to be a jerky image 108 rather than a smooth image 110). Furthermore, it often happens that the cinematic content being displayed in its window(s) suffers disproportionately in these types of situations. As is disclosed herein, systems 100 of the current embodiment increase the likelihood and/or percentage of time and conditions under which the system 100 produces smooth images 110 while optimizing resource utilization when cinematic content is being presented. Conversely when cinematic content is not being presented, the current embodiment increases the likelihood that productivity applications are not impaired by lower cinematic rates by reverting to the display's native refresh rate. By reverting to the display's refresh rate, the current embodiment allows productivity-related (and other) content to be displayed at the higher refresh rate at which it is less likely to exhibit jerky behavior.

With continuing reference to FIG. 1, a wireless signal 112 that conveys the images 108 and/or 110 is transmitted from an antenna 114 of the media device 104 to an antenna 116 of the display 102. These antennae 114 and 116 of this instance are configured to operate as part of a Wi-Fi (i.e., wireless fidelity) local area network (LAN) and the wireless signal 112 is formatted in accordance with a wireless display protocol.

FIG. 1 also illustrates a media 118 on which one or more pieces of content 119 (perhaps including images of the subject 106) is stored. That content 119 in the current embodiment has an associated cinematic (frame) rate 120 whereas the display has an associated refresh rate 122. Furthermore, FIG. 1 illustrates that the jerky image 108 includes duplicate frames 126, a dropped frame 128, a torn frame 130, judder-related effects, etc. whereas the smooth image 110 includes frames 124 which exhibit frame-to-frame changes corresponding to the actual changes associated with the subject 106 at the time that the frames 124 where captured. The torn frame 130 of the jerky image 108, in contrast, includes two frame portions 132 and 134 from differing frames 124.

With ongoing reference to FIG. 1, the system 100 of the current embodiment plays the content 119 on the media device 104, transmits smooth images 110 therefrom, and allows displays 102 to receive those smooth images 110 for presentation to those watching the display. FIG. 1, moreover, illustrates jerky image 108 for comparison to the smooth images 110, which are sought by many viewers and/or other users of the system 100. As noted elsewhere herein, when viewed, the smooth image 110 provides a pleasing visual effect wherein movements of the subject 106 appear to move proportionally between the individual frames 124 of the smooth image 110.

For instance, should the subject 106 or portions thereof (as captured in the content 119) be moving at a constant speed, then the position of the subject 106 would appear to change by a constant amount between the frames 124 of the smooth image 110 as viewed on the display 102. Furthermore, if the subject 106 were accelerating at a constant rate, then the difference in the subject's position between the frames 124 would reflect that constant rate of acceleration. Moreover, in most situations, few or no duplicate frames 126, dropped frames 128, torn frames 130, etc. would appear in the smooth image 110.

In contrast, as viewed on displays of conventional systems, the jerky image 108 would contain unwanted duplicate frames 126 (in addition to those duplicate frames intentionally inserted into the jerky image 108), dropped frames 128, torn frames 130, etc. Such anomalies arise from a number of sources of which only a sampling will be discussed here in order to not obscure embodiments.

For instance, a pair (or set) of duplicate frames 126 might arise from one component in the pipeline operating at a higher frame rate than another component upstream there from in the pipeline. As a result, the faster downstream component might grab one frame 124 from the slower downstream component and then wait a relatively short time. At the end of that wait time, the faster component might then attempt to grab another frame 124 from the slower upstream component. Because the slower component has not yet had time to update the frame 124 in its buffer, though, the faster component will often happen to grab a duplicate of the frame 124 currently in the slower component's buffer. As a result, the pair of unwanted duplicate frames 126 appears in the jerky image 108. Unless the rate of all faster downstream components happens to be an exact multiple of the slower upstream component rate thereby resulting in the same number of duplicate frames 126 of each frame 124, the user will perceive the content playback experience to be jerky.

In the alternative, the faster upstream component might attempt to grab and propagate a frame 124 while the slower downstream component is updating its buffer. Accordingly, the faster component might grab a frame portion 132 from one frame 124 and a frame portion 134 from another frame 124. Since subjects 106 often move between frames 124, a disjoint between the position of the subject 106 in the frame portions 132 and 134 would appear in the torn frame 130. Such a situation is illustrated in FIG. 1 by the displacement between the lower portion of the subject 106 and the upper portion of the subject 106. The resulting torn frame 130 would of course then appear in the jerky image 108.

Conversely, a slower downstream component might altogether miss an update of a faster upstream component's buffer thereby dropping a frame 124 and causing a dropped frame 128 to "appear" in the jerky image 108. Of course, in this particular context, the term "appear" means that no frame 124 appears in the jerky image 108 at its corresponding play-point or, depending on the display 102, the previous frame 124 appearing in the jerky image 101 might appear one or more times than intended. Because of these anomalies, the subject 106 in the jerky image 108 fails to move smoothly and instead jumps or jerks (among other undesired effects) between viewed frames 124.

Furthermore, even in systems where the frame rate of the upstream component and the downstream components are the same, there is still the possibility of a jerky image 108 if the downstream component is sampling at or near the time where upstream buffers are being swapped/updated due to some non-zero amount of timing jitter in the operation of various pipeline components. This result is likely even if the various components are operating at the same average frame rate. More specifically, almost any jitter associated with one or more of the components will cause the sampling to dance back and forth across decision boundaries and thus between adjacent frames. As a result, the number and frequency of dropped/duplicated frames in such systems can equal corresponding conditions in systems with frame rate mismatches. Capture positioning and synchronization techniques disclosed herein alleviate such conditions in both types of systems (those with more or less matched frame rates but with jitter and those with frame rate mis-matches) as well in systems with asynchronous components.

Moreover, in conventional systems, driving display systems and/or any upstream pipeline component at a higher default rate consumes more wireless bandwidth and power. Accordingly, the available bandwidth associated with the wireless signal 112 available for other uses happens to be less than the wireless bandwidth of various embodiments. Additionally, driving conventional displays 102 and/or any upstream pipeline component at their display rates 122 (or other higher rates) also consumes more power than operations involving embodiments. As a result, conventional, battery-operated media devices 104 (and other system components) might deplete their onboard power sources earlier as indicated by the "Low Battery" warning 136 on the media device 104 or the display 102.

It might be worth noting that the content 119 need not be captured visual content. Indeed audio content, simulated visual content, animated content, rendered gaming content, Internet or streamed content, live content, and/or other types of so-called "media" content captured, stored, streamed, broadcast, etc. in a series of frames 124 are within the scope of the current disclosure.

Figure 2:
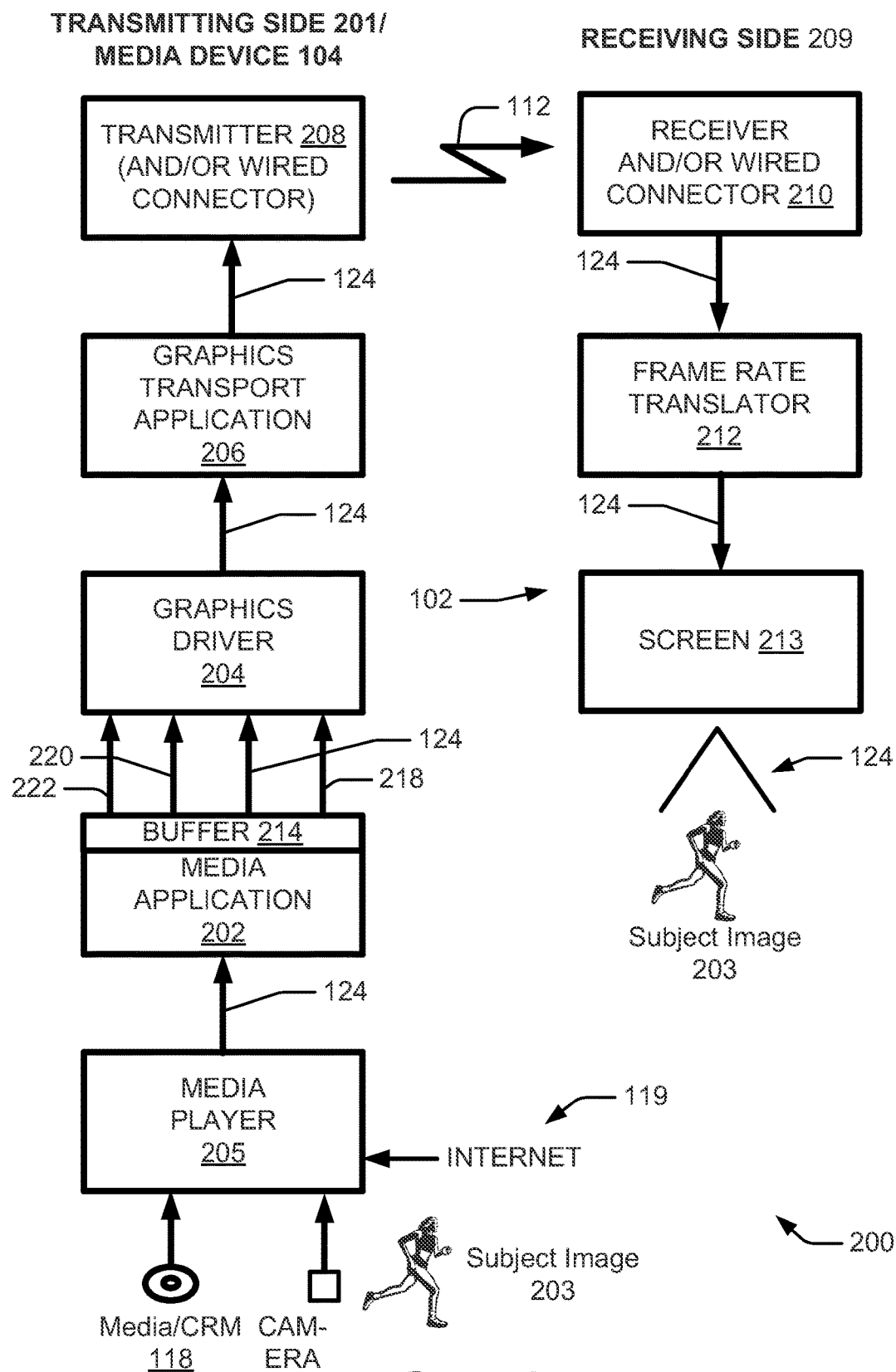
FIG. 2 illustrates a block diagram of a content distribution system.

FIG. 2 illustrates a block diagram of another exemplary moving-images content distribution system. The system 200 of the current embodiment includes a transmitting side 201 (or media device 104) which further includes the media 118 (with content 119 related to the subject 106 and/or a subject image 203), a media application 202, a graphics driver 204, a media player 205, a graphics transport application 206, and a transmitter 208 (and/or a wired connector). The system 200 also includes a receiving side 209, which further includes a receiver 210, a frame rate translator 212, and a screen 213 or other display surface or element. The receiver 210, frame rate translator 212, and screen 213 can be components of the display 102 and/or associated therewith. Moreover, the system also includes one or more frame buffers 214 one of which is illustrated as being a component of the media application 202. In addition to the frames 124 and wireless signal 112, FIG. 2 illustrates provisions for a frame rate indication 218, mode changes 220, and a synchronization signal 222.

System 200 of FIG. 2 includes the media player 205, which plays the content 119 including frames 124 of subject image 203. In other words, the media player 205 reads the frames 124 of the subject image 203 from the media 118. It sends these frames 124 to the media application 202. Colloquially, therefore, the media player 205 "plays" the media 118 or content 119. Of course, the content 119 might be conveyed to the media application 202 via an electromagnetic, infrared, Internet connection, etc. signal.

With ongoing reference to FIG. 2, the media application 202 includes the frame buffer 214 and communicates with the media player 205 and the graphics driver 204. In some embodiments, media application 202 communicates the frames 124 via buffer 214 to the graphics driver 204 indirectly using standard operating system calls (not shown). More specifically, the media application 202 receives the frames 124 from the media player 205 and (usually) at a frame rate determined at the time that the subject image 203 is/was captured. In some embodiments, the media application 202 forwards the frames 124 to the graphics driver 204. The media application 202 can also place the frames 124 in its frame buffer 214 one (or more) at a time. As is disclosed further herein, it can also signal the graphics driver 204 when it has updated the frame buffer 214 with a new or "current" frame(s) 124.

The media application 202 of some embodiments can be either "enabled" or non-enabled or can have a mixture of enabled and non-enabled features. If the media application is non-enabled, or if it is a conventional or legacy media application 202, the media application 202 typically forwards the frames 124 to the graphics driver 204 (via the frame buffer 214 if such a buffer is provided in the system 200). If the media application 202 is enabled, though, it can determine the frame rate at which the content 119 has been generated/captured and/or is being received. Moreover, the media application 202 can generate a signal indicative of the frame rate and send that frame rate indication 218 to the graphics driver 204.

The media application 202 might also handle content 119 related mode changes 220. These mode changes 220 often involve changes in how the content 119 is to be displayed on the display 102. For instance, it might be desirable to display the content 119 using the full screen 213 of display 102. In the alternative, it might be desirable to use only a portion 107 of the screen 213 to, for instance, view a "thumbnail" of the content 119 in a graphical window.

A user or viewer can initiate these mode changes 220. For instance, a particular portion of the content 119 might be a webcast or a movie stored on a DVD, which the user wishes to view on the screen 213. Another portion of content 119 might be a productivity application (for instance, a word processing document, a spreadsheet, etc.) also being rendered on the display. Accordingly, the user might want to switch between viewing various pieces of content 119 in full-screen mode and other pieces of content 119 in thumbnail mode as circumstances suggest. In such situations, the user could minimize/maximize or otherwise adjust the size of the windows in which the pieces of content 119 are shown accordingly. The media application 202 can examine the user inputs and/or frames 124 received from the media player 205 to detect such mode changes 220.

However, there might be times when the media application 202 initiates a mode change 220. For instance, when a new piece of content 119 begins playing (or being received by the media application 202), the media application 202 might switch the display 102 to full-screen display mode for that content 119. Conversely, when the content 119 reaches its endpoint, the media application 202 might switch that content 119 to a thumbnail mode or even terminate the transmission of such content in the frames 124 sent forward through the system 200.

In addition, or in the alternative, the media application 202 can initiate mode changes 220 by inferring (from information implicitly conveyed by the content) that a mode change is called for. Responsive to such inferences, the media application 202 can switch between modes thereby configuring various pipeline components to process/render the content at a rate corresponding to the new mode. For example, the media application 202 could infer that content formatted in accordance with the YUV 4:2:0 color mode is likely to be cinematic content. Responsive to such determinations, the media application 202 can initiate a mode change to convey the content at a cinematic rate thereby enabling other pipeline components to process frames 124 differently and/or at a cinematic frame rate due to the presence of YUV 4:4:4 color in (or associated with) the content 119.

The media application 202 of the current embodiment can also examine the content 119 (and user inputs) to determine if a mode change 220 has or is about to occur. If so, the media application 202 can generate a signal indicative of the mode change 220 and send the same to the graphics driver 204.

With continuing reference to FIG. 2, media applications 202 of some embodiments send the synchronization signal 222 to the graphics driver 204. More specifically, these media applications 202 use the synchronization signal 222 in conjunction with the frame buffer 214 to coordinate the transfer of frames 124 to the graphics driver 204. For instance, the media application 202 can be configured to place a new frame 124 in the frame buffer 214 and send the synchronization signal 222 to the graphics driver 204 when the media application 202 has determined that that frame 124 is ready for retrieval. Thus, the synchronization signal 222 can serve to alert the graphics driver 204 to the presence of a new or a current frame 124 in the frame buffer 214.

A few words about the graphics driver 204 might now be in order. The graphics driver 204 of the current embodiment provides functionality to allow the operating system of system 200 (as well as the media application 202 and graphics transport application 206) to interact with the graphics related hardware of the system 200.

A downstream graphics transport application 206 is often used in embodiments where the frames 124 are delivered using a wireless transmitter 208 over a wireless signal 112. A graphics transport application 206 may not exist or be utilized in embodiments where a wired connector 208 is in use. In embodiments where a graphics transport application 206 is used, mode changes 220, synchronization signal 222, and frame rate indication 218 may be delivered to the graphics transport application 206 in addition to or instead of the graphics driver 204. The graphics transport application 206 and the graphics driver may share or coordinate mode changes 220, synchronization signal 222 and frame rate indication 218 in some embodiments.

In the current embodiment, the graphics driver 204 communicates with the operating system (not shown), the media application 202, and the graphics transport application 206 and the graphics related hardware among other system 200 components. More specifically, the graphics driver 204 receives the frames 124 from the media application 202 and forwards them to the graphics transport application 206. The graphics driver 204 also receives the frame rate indication 218 and synchronization signal 222 from the media application 202.

Moreover, if the media application 202 determines whether mode changes 220 have occurred, are occurring, or are about to occur (i.e., a mode change 220 is imminent), the graphics driver 204 of the current embodiment can receive an indication of those mode changes 220 from the media application 202. In the alternative, or in addition, the graphics driver 204 can examine the playing content 119 (or rather the frames 124 thereof) to determine whether the media application 202 has attempted to cause (or is likely to be causing) a mode change 220.

For instance, the graphics driver 204 can compare adjacent frames 124 to determine whether one or more windows associated with the various pieces of content 119 have changed sizes and/or whether the content 119 conveys other information indicative of a mode change 220. For instance, the frame rate associated with many pieces of content 119 changes from a cinematic rate 120 to a different cinematic rate (or to the display refresh rate 122 when credits for the content 119 begin to roll. The media application 202 or graphics driver 204 can (by timing or other methodology) detect the new frame rate being used for credits and switch frame rates accordingly. If the graphics driver 204 detects a mode change 220, the graphics driver 204 can alter the frames 124 it sends to the graphics transport application 206 to reflect that the windows of one or more pieces of playing content 119 have changed size, ought to change size, or it is desired that they do so.

Moreover, the graphics driver 204 can alter the frame rate at which the frames 124 are forwarded to the transmitter 208 and thence to the display 102. For instance, conventional systems transmit the frames 124 to the display at the display's native or preferred refresh rate 122 regardless of the content 119 in those frames 124 and, more specifically, regardless of the frame rate at which the content 119 was captured. Since the display refresh rate 122 is usually higher than the frame rate of the content 119 and/or typical cinematic rates 120, such practices can be wasteful. For instance, transmission at the higher display refresh rate 122 can waste wireless bandwidth and power associated with the difference between the higher refresh rate 122 and the lower cinematic rate 120.

It is noted here that the transmitter 208 of the current embodiment is passive in that when it receives a frame 124 from the graphics transport application 206 it transmits that frame 124 and may assume a low power state until it receives another frame 124 for transmission. Thus, the rate at which the graphics transport application 206 forwards frames 124 determines the activity, power level, and bandwidth consumption of the transmitter 208 and hence (at least in part) of the transmitting side 201 of system 200. Likewise, because the receiving side 209 consumes more power when receiving (and thence displaying) a transmitted frame 124 than when idle, the rate at which the graphics transport application 206 forwards frames 124 to the transmitter influences the power consumed by the receiving side 209. In the case of wireless transmission, frames are often encoded prior to transmission and decoded prior to display, further increasing the difference in power consumed.

Moreover, if any portion of the system 200 is battery powered, transmission at the higher display refresh rate 122 consumes power and therefore drains the battery or batteries of those portions more than transmission at the lower cinematic rate 120 might. Battery powered laptop PCs, displays 102, etc. therefore will likely have longer battery-powered lives when various embodiments are included therein than not.

Moreover, graphics transport applications 206 of the current embodiment switch the frame rate at which they forward frames 124 to the transmitter 208 to the lower cinematic rate 120 under various circumstances. For instance, if the content 119 is playing (or was captured) at one of the cinematic rates 120, then the graphics transport application 206 illustrated in FIG. 2 will switch to the lower cinematic rate 120. Then, when circumstances suggest that transmitting at the higher display refresh rate 122 might be desired, the graphics transport application 206 can switch to the refresh rate 122. For instance, the user of a PC might cause the focus to shift to a productivity application, a gaming application, or some feature of the desktop of the PC, which is typically driven at the refresh rate 122. In such situations the graphics transport application 206 of the current embodiment will switch to a frame rate appropriate for the content receiving the focus.

In some embodiments, the graphics transport application 206 can be a software application. In other embodiments, the graphics transport application 206 can be hardware logic that is configured for the particular tasks associated therewith.

In any case, the transmitter 208 transmits the frames 124 at the rate controlled or determined by the graphics transport application 206. Likewise, the receiver 210 receives the frames 124 at the rate determined by the graphics transport application 206 (in the absence of some disturbance, environmental condition, RF interference, wired connector malfunction, etc.). The receiver 210 forwards the received frames 124 to the frame rate translator 212 if the system 200 includes such a component.

In the current embodiment, the system 200 includes a frame rate translator 212 as illustrated by FIG. 2. Some frame rate translators 212 accept frames 124 which it receives at one frame rate and modifies the image 108 and/or 110 to include enough frames 124 such that it appears to be arriving at the display 102 at the display refresh rate 122. In this manner, the display 102 (in a nominal sense) receives enough frames 124 such that it displays a refreshed frame 124 for the viewer at each refresh even if some of those refreshed frames 124 happen to be deliberately replicated or duplicated frames 126. In the absence of frame rate translator 212, many displays 102 will continue to display (at the display refresh rate 122) the last frame 124 they received until a new frame 124 arrives. Thus, the presence of a frame rate translator 212 in system 200 is not necessary for the practice of the current disclosure.

Whether or not a frame rate translator 212 exists in the system 200, the display 102 of the current embodiment presents the frames 124 it receives as it receives them and in their as-received condition. Thus, the system 200 delivers subject image 203 to the screen 213 where users can view it. Moreover, in the current embodiment, the screen 213 is driven at a rate depending on the content 119 being displayed thereon. For instance, if only cinematic content 119 is being rendered, then the screen 213 is driven at the slower cinematic rate. If, however, only productivity applications are being rendered (or if the cinematic content is in a window considered to be of lesser importance) then the screen 213 can be refreshed at the higher refresh rate 122. It might be useful at this juncture to consider (with reference to FIG. 3) the playing of content 119.

Exemplary Processes

Figure 3:
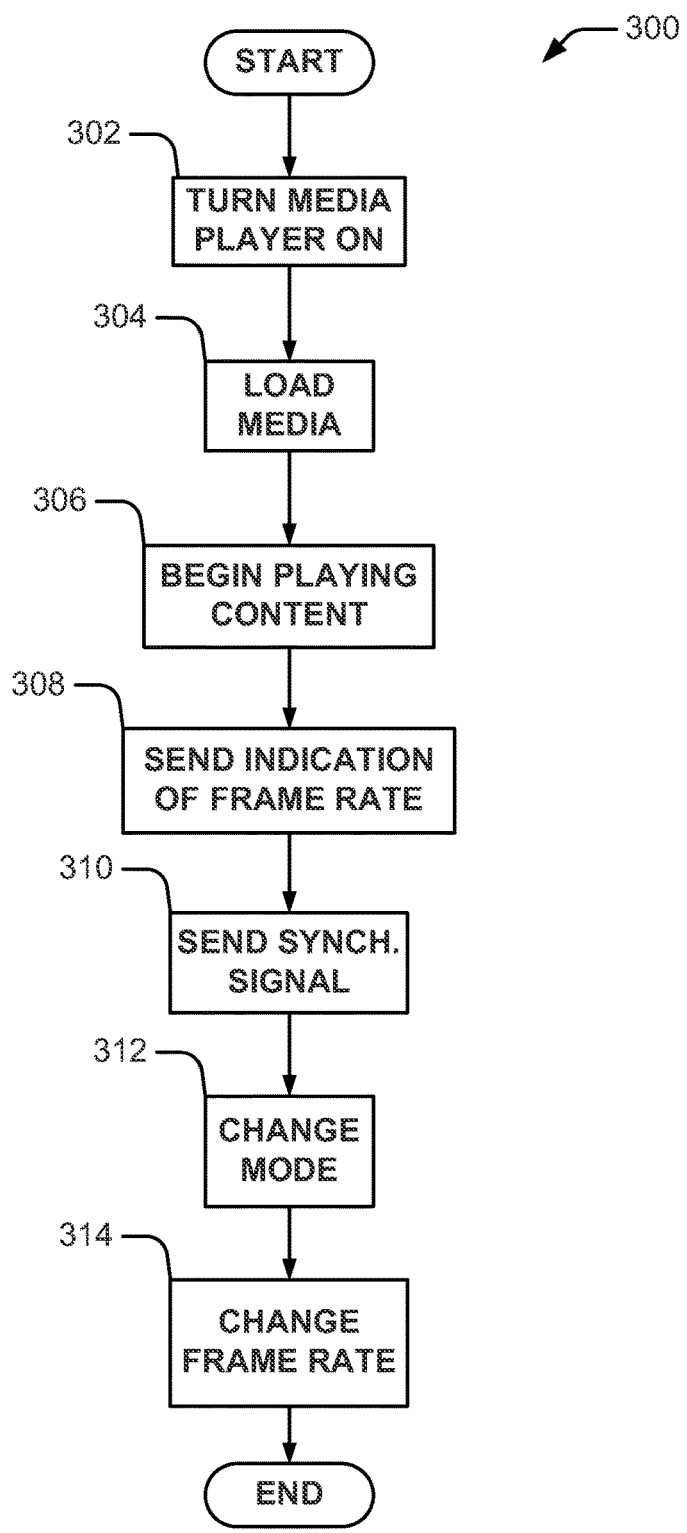
FIG. 3 illustrates a process of playing content.

FIG. 3 illustrates an exemplary process of playing content. More specifically, FIG. 3 illustrates method 300 that can begin when the media device 104 (of FIG. 1) is turned on, booted up, or otherwise becomes active. See reference 302. In cases where the media device 104 accepts physical media 118, reference 304 provides for the loading of that media 118. In other embodiments, though, the media 118 need not be loaded. For instance, the streaming media may be received/buffered. Also, a video-camera embodiment of the media device 104 can begin capturing video image content 119 whereas a microphone embodiment of the media device 104 can begin receiving sound waves and generating audio content. In any event, the media device 104 (or rather, a media player 205 resident therein) can begin playing (or producing) the content 119 as reference 306 indicates.

If the media player 205 is so configured it can send the frame rate indication 218 to the media application 202. See reference 308. Of course, the images 108 or 110, which the media player 205 generates, can implicitly convey such information by the manner in which they are framed, encoded, stored, etc. In the alternative, or in addition, another component (for instance, the media application 202) can determine the frame rate and send the frame rate indication 218 thereof to some other component.

As disclosed elsewhere herein, as the content 119 is generated or played, the media player 205 produces frames 124 and sends them to other components in the system notably to the media application 202. However, components of system 200 downstream thereof might not be aware of when each frame 124 becomes available. Thus, the media application 202 (or some other component) can generate a synchronization signal 222 to alert other components of the availability of a new or a current frame 124. See reference 310.

At some point, a mode associated with one or more of the pieces of content 119 being distributed by system 200 might change. For instance, a user might change the focus to a productivity application (thereby causing a media application 202 initiated mode change). In other situations, a user might resize a window in which a piece of content 119 is playing. See reference 312. In other situations, a user might change the focus from a productivity application to a minimized window or thumbnail, which is displaying a piece of content 119 (captured at a cinematic rate 122). In which case, the system 200 would switch from driving the display at the display refresh rate 120 to driving the display at the cinematic rate 120. Of course, the converse can happen wherein the focus shifts to the higher frame rate productivity application. As a result, the system 200 could switch to the higher refresh rate 122 for the display 102. See reference 314. Having disclosed some aspects of playing content 119, it might be useful at this juncture to disclose processes for distributing content 119.

Figure 4:
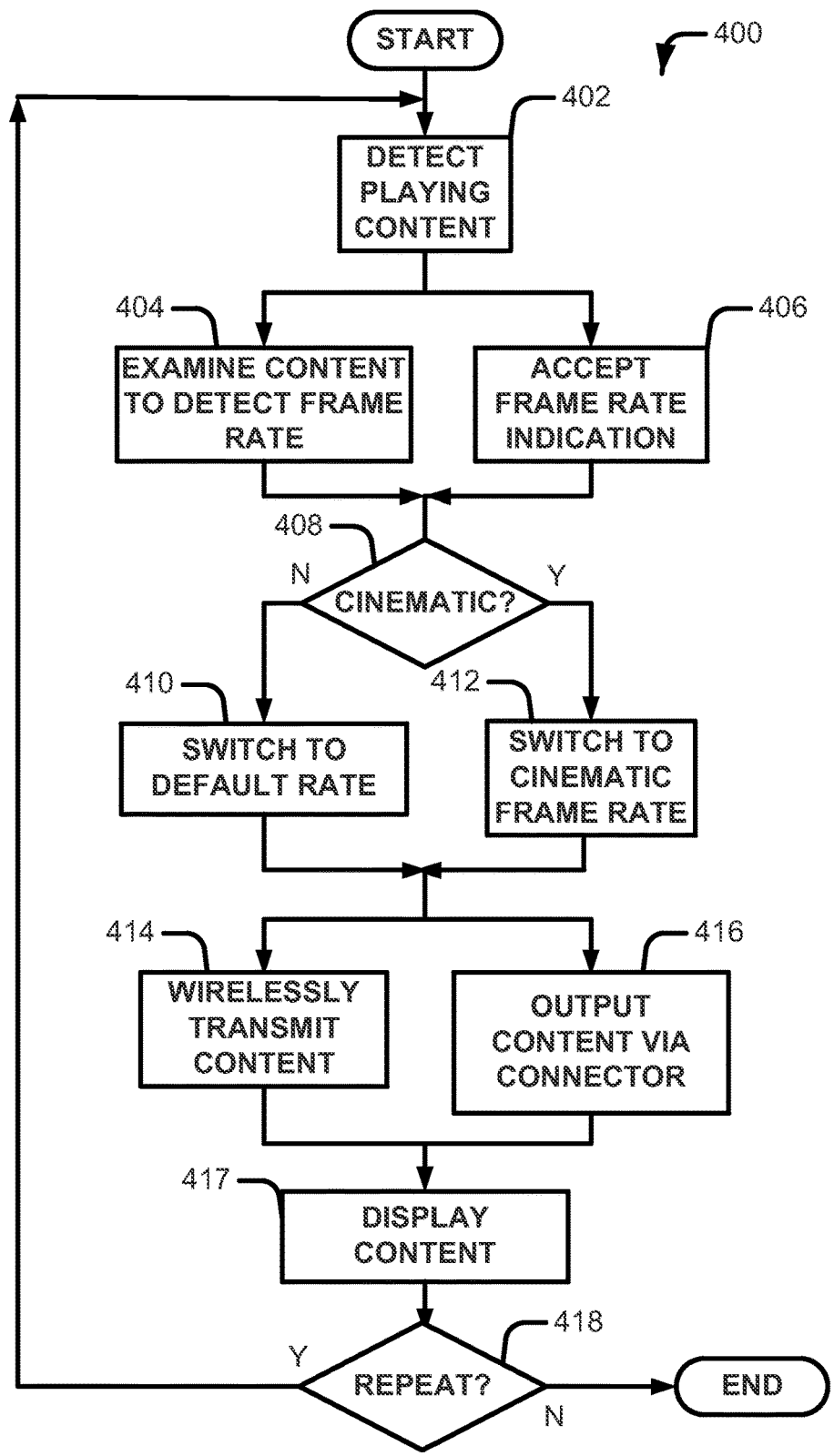
FIG. 4 illustrates a process of distributing content.

FIG. 4 illustrates an exemplary process of distributing content. The process 400 can begin at reference 402 at which the playing of a piece of content 119 is detected by, for instance, the media application 202. Media application 202 might detect the beginning of the content 119 when it receives the first (or other) frame 124 of content 119 or some indicia that the content 119 is playing, being generated, captured, etc. (or that such activity is about to occur).

In addition, or in the alternative, the graphics driver 204 (and/or graphics transport application 206) can monitor the media application 202 and/or control signals associated with it to determine that the media player 205 is about to begin playing content 119. For instance, if the graphics driver detects that media 118 is being loaded or that a "play" button has been pressed on the media device 104, among other illustrative scenarios, the graphics driver 204 (or graphics transport application 206 can switch between frame rates in a preemptive or proactive manner. Thus, if the playing of the content is incipient, the system 200 can anticipate the change and switch display rates shortly before the change occurs.

Process 400 can continue by determining the frame rate of the content 119 being played. For instance, reference 404 illustrates that the graphics driver 204 can examine the frames 124 of the content 119 to determine the frame rate at which it is being played. In the alternative, or in addition, the media player 205, media application 202 etc. might send an indication of the frame rate to the graphics driver 204. Thus, the graphics driver 204 (and/or graphics transport application 206) can accept the frame rate indication 218 as illustrated by reference 406.

A determination regarding whether the frame rate and/or content is cinematic or not can be made at reference 408. If the frame rate is not cinematic, process 400 can branch to reference 410. At reference 410, the graphics transport application 206 can begin (or continue) transmitting frames 124 at the default frame rate which is often the display frame rate 122, but can also be the maximum capability of a particular pipeline component. If, however, the frame rate of the content 119 is determined to be cinematic, the graphics transport application 206 can switch to (or continue) transmitting at the lower cinematic rate 120. However, that the content might or might not be playing at a cinematic rate is not necessarily determinative of whether the system switches modes to a higher/lower frame rate. Rather (besides the content's frame rate), other information can influence this determination. For instance, the content 119 itself might convey information indicative of the mode at which it can be displayed as when the user has placed the content in thumbnail or full screen mode. In addition, or in the alternative, the content might convey information indicating which mode should be used to render the content as when it is encoded using the YUV color code which can indicate that the cinematic rate might be appropriate. See reference 412.

Process 400 can continue at either reference 414, reference 416, or both. See FIG. 4. Whereas, reference 414 illustrates the frames 124 being transmitted wirelessly, reference 416 illustrates the frames 124 being output via a wired connector from the transmitting side 201 to the receiving side 209. As a result, the display 102 can receive the frames 124 and display them on the screen 213 by either or both methods. See reference 417.

Figure 5:
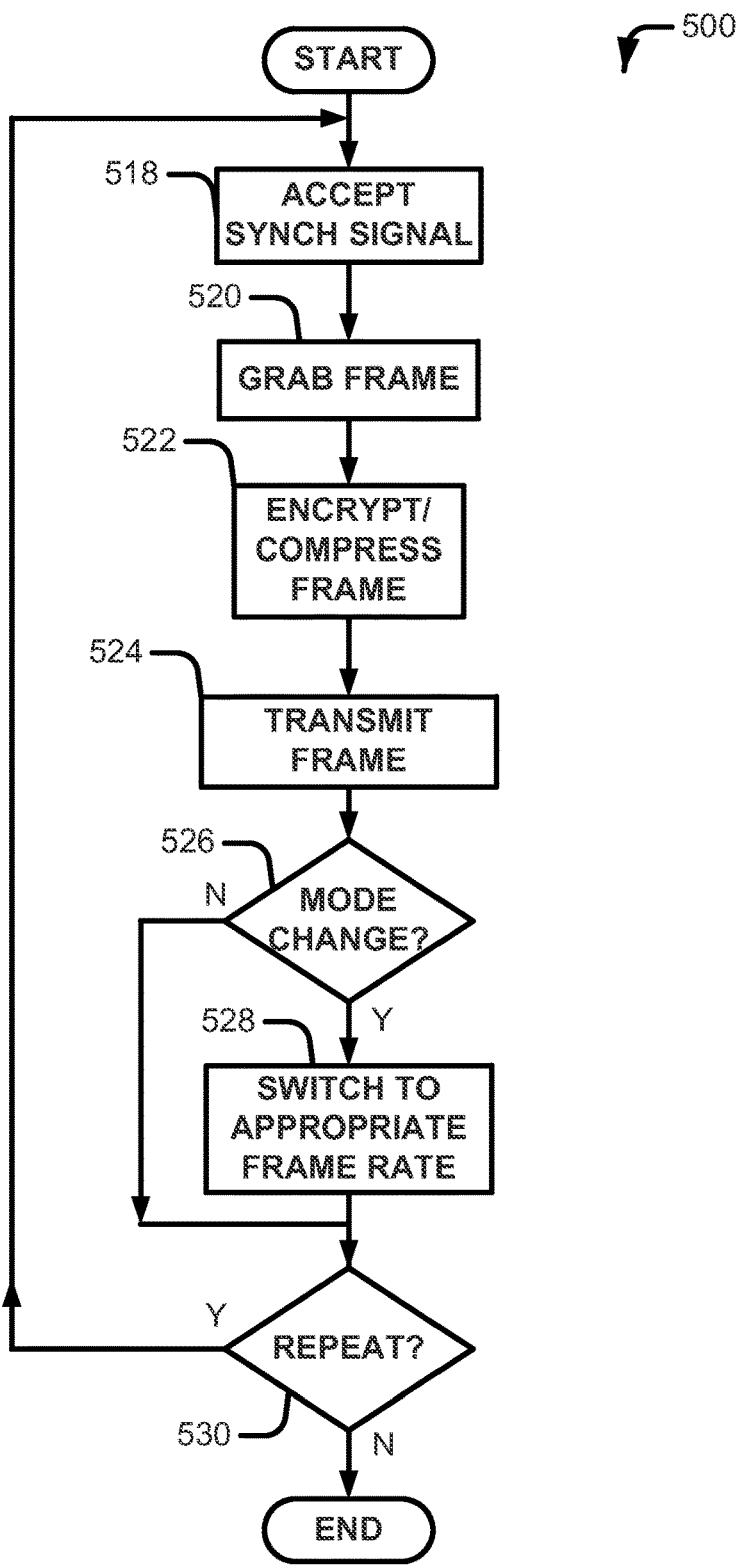
FIG. 5 illustrates another process of distributing content.

FIG. 5 illustrates another process of distributing content. Some implementations of process 400 (see FIG. 4) include other activities such as those indicated by references 518, 520, 522, 524, 526, and/or 528 of method 500. For instance, the media application 202 can generate a synchronization signal 222. In the alternative, the graphics driver 204 may be able to generate its own internal synchronization signal by examining media application 202 behavior related to the presentation of frames 124, and then deliver that signal to the graphics transport application 206. See reference 518. In response to the synchronization signal 222, the graphics transport application 206 can grab the frame 124 currently in the frame buffer 214. In some embodiments, the frame buffer 214 is obtained by software API calls to the graphics driver 206, while in other embodiments the frame buffer is obtained and propagated directly by hardware logic. See reference 520. Moreover, the graphics driver 204 or some other component can compress and/or encrypt the grabbed frame as illustrated by reference 522. The transmitter 208 can also transmit the compressed frame 124 at reference 524. It is noted that, because the graphics driver 204 and/or graphics transport application 206 in the current implementation only grabs, compresses, encrypts, and/or causes the transmission of current frames 124 and at the determined frame rate, the current process 400 conserves bandwidth, power, etc. for other activities.

Moreover, as noted elsewhere herein, it might be the case that a mode associated with one or more pieces of playing content 119 might change. Accordingly, process 500 of some implementations includes determining whether such mode changes 220 have occurred, are occurring, or are imminent. See reference 526. If so, process 500 can include switching to a frame rate appropriate for the mode change 220. See reference 528.

In any event, the process 500 of the current implementation can proceed at reference 530. Reference 530 indicates that process 500 can be repeated in whole or in part or can end as might be desired. Accordingly, embodiments allow even conventional displays to present smooth images 110 more often and with great reliability. These smooth images 110 are often free (or largely free of) of duplicate frames 126, dropped frames 128, torn frames 130, judder-related effects, etc. Systems 200 also save power, processing resources, and bandwidth for purposes other than distributing content 119 as compared to many conventional systems.

Additional and Alternative Implementation Notes

Unless the context indicates otherwise, industry-standard cinematic frame rate is approximately 24 frames per second (FPS) and/or 25 FPS. In reality, the industry-standard cinematic frame rate varies in practice by +/−5% of the absolute 24 or 25 frames. In some instances, the actual rate used varies by +/−1%. Often a rate of 23.976 FPS or 24.975 FPS is used.

The moving-images content described herein may include (but not limited to) video, digital film, video games, animation, television, and the like. Generally, the moving-images content includes a series of moving images that are intended to be presented to the viewer in a defined sequence and to produce an overall visual impression of movement or perception of a reality.

In the above description of exemplary implementations, for purposes of explanation, specific numbers, materials configurations, and other details are set forth in order to better explain the present invention, as claimed. However, it will be apparent to one skilled in the art that the claimed invention may be practiced using different details than the exemplary ones described herein. In other instances, well-known features are omitted or simplified to clarify the description of the exemplary implementations.

The inventor intends the described exemplary implementations to be primarily examples. The inventor does not intend these exemplary implementations to limit the scope of the appended claims. Rather, the inventor has contemplated that the claimed invention might also be embodied and implemented in other ways, in conjunction with other present or future technologies.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts and techniques in a concrete fashion. The term "technology," for instance, may refer to one or more devices, apparatuses, systems, methods, articles of manufacture, and/or computer-readable instructions as indicated by the context described herein.

As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more," unless specified otherwise or clear from context to be directed to a singular form.

These processes are illustrated as a collection of blocks in a logical flow graph, which represents a sequence of operations that can be implemented in mechanics alone or a combination with hardware, software, and/or firmware. In the context of software/firmware, the blocks represent instructions stored on one or more computer-readable storage media that, when executed by one or more processors, perform the recited operations.

Note that the order in which the processes are described is not intended to be construed as a limitation, and any number of the described process blocks can be combined in any order to implement the processes or an alternate process. Additionally, individual blocks may be deleted from the processes without departing from the spirit and scope of the subject matter described herein.

The term "computer-readable media" includes computer-storage media. For example, computer-storage media may include, but are not limited to, magnetic storage devices (e.g., hard disk, floppy disk, and magnetic strips), optical disks (e.g., compact disk (CD) and digital versatile disk (DVD)), smart cards, flash memory devices (e.g., thumb drive, stick, key drive, and SD cards), and volatile and non-volatile memory (e.g., random access memory (RAM), read-only memory (ROM)).

In the claims appended herein, the inventor invokes 35 U.S.C. § 112, paragraph 6 only when the words "means for" or "steps for" are used in the claim. If such words are not used in a claim, then the inventor does not intend for the claim to be construed to cover the corresponding structure, material, or acts described herein (and equivalents thereof) in accordance with 35 U.S.C. § 112, paragraph 6.

The invention claimed is:

1. A method comprising:
   detecting a playing of moving-images content on a particular window mode from among different window modes, the particular window mode indicating how the moving-images content is presented on a display;
   responsive to the detecting of the playing of the content, detecting a frame rate of the content in accordance with the particular window mode;
   based on the detected frame rate of the content, determining whether the frame rate is an industry-standard cinematic frame rate;
   generating a mode change signal that indicates changes in the particular window mode; and
   responsive to (i) determining that the frame rate is the cinematic frame rate, and (ii) the mode change signal indicating that the particular window mode is associated with a user viewing the moving-images content on the display, initiating a switching from (i) driving the display at a refresh rate that is higher than the cinematic frame rate to (ii) driving the display with the playing of the content at the cinematic frame rate,
   wherein the mode change signal is generated in response to the user changing a focus from one windowed application to another windowed application from among a plurality of displayed windowed applications.

2. The method as recited by claim 1, wherein the determining whether the frame rate is the cinematic frame rate further comprises accepting an indication of the cinematic frame rate from a content player associated with the content.

3. The method as recited by claims 1, wherein the determining whether the frame rate is the cinematic frame rate further comprises examining the playing of the content.

4. A method comprising:
   detecting a playing of moving-images content on a particular window mode from among different window modes, the particular window mode indicating how the moving-images content is presented on a display;
   responsive to the detecting of the playing of the content, detecting a frame rate of the content in accordance with the particular window mode;
   based on the detected frame rate of the content, determining whether the frame rate is a cinematic frame rate;
   generating a mode change signal that indicates changes in the particular window mode;
   responsive to (i) determining that the frame rate is the cinematic frame rate, and (ii) the mode change signal indicating that the particular window mode is associated with a user viewing the moving-images content on the display, initiating a switching from (i) outputting a first signal for the display at a display refresh rate that is higher than the cinematic frame rate, to (ii) outputting a second signal for the display at the cinematic frame rate,
   wherein the mode change signal is generated in response to the user changing a focus from one windowed application to another windowed application from among a plurality of displayed windowed applications.

5. The method as recited by claim 4, wherein the playing of the content is incipient.

6. The method as recited by claim 4, wherein the determining whether the frame rate is the cinematic frame rate further comprises accepting an indication of the cinematic frame rate from a content player associated with the content.

7. The method as recited by claim 4, wherein the determining whether the frame rate is the cinematic frame rate further comprises examining the content.

8. The method as recited by claim 4, further comprising transmitting the playing of the content at the cinematic frame rate via a wireless transmitter.

9. The method as recited by claim 4, further comprising outputting the playing of the content at the cinematic frame rate via a wired connector.

10. The method as recited by claim 4, wherein the display refresh rate is 60 Hz and wherein the cinematic frame rate is an industry-standard cinematic frame rate.

11. The method as recited by claim 4, further comprising compressing a new frame of the content.

12. A system comprising:
   a graphics driver configured to be executed by one or more processors in communication with a content source and configured to:
   detect a playing of a moving-images content by the content source on a particular window mode from among different window modes, the particular window mode indicating how the moving-images content is presented on a display;

responsive to the detection of the playing of the content, detect a frame rate of the content in accordance with the particular window mode, based on the detected frame rate of the content, determine whether the frame rate is a cinematic frame rate;

generating a mode change signal that indicates changes in the particular window mode; and a graphics transport application configured to be executed by one or more processors and in communication with the graphics driver and the display, the graphics transport application being further configured to, responsive to (i) determining that the frame rate is the cinematic frame rate, and (ii)) the mode change signal indicating that the particular window mode is associated with a user viewing the moving-images content on the display, initiating a switching from providing (i) a first drive signal for the display at a display refresh rate that is higher than the cinematic frame rate to (ii) providing a second drive signal for the display at the cinematic frame rate, wherein the mode change signal is generated in response to the user changing a focus from one windowed application to another windowed application from among a plurality of displayed windowed applications.

13. The system as recited by claim 12, wherein the graphics driver is further configured to detect the frame rate of the content by accepting an indication of the frame rate of the content from the content source.

14. The system as recited by claim 12, wherein the graphics driver is further configured to detect the frame rate of the content by examining the content.

15. The system as recited by claim 12, wherein the graphics transport application is further configured to transmit the playing of the content at the cinematic frame rate via a wireless transmitter.

16. The system as recited by claim 12, wherein the graphics transport application is further configured to output the playing of the content at the cinematic frame rate via a wired connector.

17. The system as recited by claim 12, wherein the display refresh rate is 60 Hz and wherein the cinematic frame rate is an industry-standard cinematic frame rate.

18. The system as recited by claim 12, wherein the graphics transport application is further configured to compress a new frame of the content.

19. The method of claim 1, further comprising:
accepting a synchronization signal that indicates a presence of a new frame of the content ready for retrieval, the synchronization signal being associated with the playing of the content;
responsive to the synchronization signal, grabbing the new frame of the content.

20. The method of claim 4, further comprising:
accepting a synchronization signal that indicates a presence of a new frame of the content ready for retrieval, the synchronization signal being associated with the playing of content; and
responsive to the synchronization signal, grabbing the new frame of the content.

21. The system of claim 12, wherein the graphics driver is further configured to:
accept a synchronization signal that indicates a presence of a new frame of the content ready for retrieval, the synchronization signal being associated with the playing of the content, and
responsive to the synchronization signal, to grab the new frame of the content.

\* \* \* \* \*